SIGNAL STORAGE DEVICE

Filed July 19, 1966 4 Sheets-Sheet 1

INVENTORS.
RICHARD C. HANSEN
JACK O. WILSON
BY Anthony D Cennamo
Daniel Rubin
ATTORNEYS

INVENTORS.
RICHARD C. HANSEN
JACK O. WILSON
BY
ATTORNEYS

Dec. 24, 1968 R. C. HANSEN ETAL 3,418,046

SIGNAL STORAGE DEVICE

Filed July 19, 1966 4 Sheets-Sheet 3

INVENTORS.
RICHARD C. HANSEN
JACK O. WILSON
BY Anthony D. Cennamo
Daniel Rubin
ATTORNEYS INVENTORS.
RICHARD C. HANSEN
JACK O. WILSON
BY [signature]
[signature]
ATTORNEYS United States Patent Office 3,418,046

Patented Dec. 24, 1968

3,418,046

SIGNAL STORAGE DEVICE

Richard C. Hansen and Jack O. Wilson, Rochester, N.Y., assignors to Xerox Corporation, Rochester, N.Y., a corporation of New York Filed July 19, 1966, Ser. No. 566,332
12 Claims. (Cl. 355—13)

This invention relates to a device for the mechanical storage of electrical signals adapted for time delayed switching of utilization apparatus. More specifically, the invention relates to a signal storage device for controlling the operation of a web cutter in a document recording apparatus to effect web cutting in spaced relation to recordings thereon from stored signals generated previously by the original documents of which the recordings were formed.

Many instances exist in which a subsequent event is to occur in timed relation to an event which occurred previously and at random. One common such application is in the graphic recording art in which randomly fed original documents are supplied for reproduction onto a continuous web either in the same consoled unit or via facsimile transmission to a different unit as is known in the art. The web, after appropriate processing to produce a permanent recording thereon, must later be cut by a cutter mechanism to separate each formed reproduction from the remaining portions of the web. It is usual by prior art techniques to graphically or otherwise form a reference indicia on the top or backside of the web generated by the leading and trailing edge passing of an original document past a sensing point. This indicia is later detected along the web path for controlling subsequent cutter action in predefined relation to the reproduction, e.g., to the leading and trailing edges thereof. While such systems have worked satisfactorily they have been largely limited by the marking and detection accuracy of the system and at the same time are unusable for other applications in which it is not feasible to store signals in a marking mode.

Now in accordance with the instant invention there is provided a novel mechanical signal storage device having the capacity for concomitantly stirring a plurality of signals to effect electrical switching in timed relation to signals previously generated at random. In the case of a reproduction apparatus, the storage device hereof has the capacity to concomitantly store a plurality of individual signals each generated by the passing of original copy at a scanning station whereby a subsequent web cutting operation will occur in a predetermined spaced relation to the reproduction thereon.

It is therefore an object of the present invention to provide a novel signal storage device to effect electrical switching in timed relation to signals previously generated.

It is a further object of the invention to provide a novel signal storage device for controlling cutter operation in a recording apparatus whereby to sever a recording web in predetermined spaced relation to reproductions thereon.

It is a still further object of the invention to provide a novel mechanically operable signal storage device for concomitantly storing a plurality of electrical signals to be emitted in timed relation to corresponding input signals thereto.

Further objects and features of the present invention will become apparent from the following detailed description when taken in conjunction with the drawings in which.

While the signal storage device of the invention can be employed in conjunction with a variety of utilization apparatus it will be described in combination with a xerographic recording unit by reference to FIG. 1 in which the various system components are schematically illustrated. The reproduction apparatus disclosed employs the principles of xerography which as in all xerographic systems based on the concept disclosed in Carlson patent, U.S. 2,297,691, projects a light radiation image of copy to be reproduced onto the sensitized surface of a xerographic plate to form an electrostatic latent image. Thereafter, the latent image is developed with oppositely charged developing material to form a xerographic powder image, corresponding to the latent image, on the plate surface. The powder image is then usually transferred electrostatically to a support surface to which it is fused causing the image to permanently adhere to the support surface.

Figure 1:
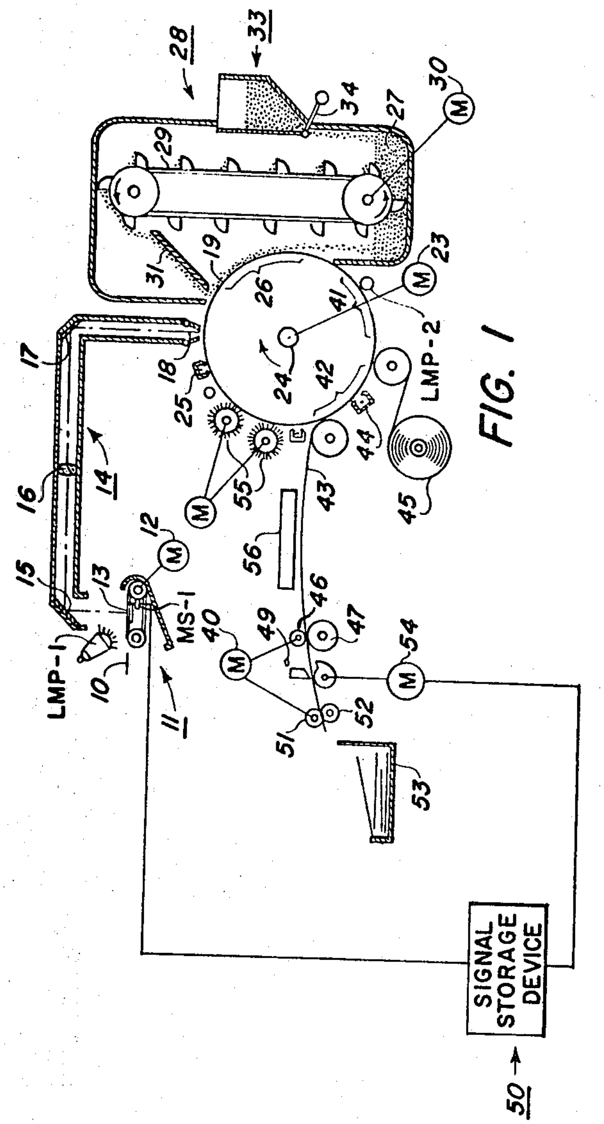
FIG. 1 is a schematic illustration of a reproduction apparatus utilizing the storage device of the invention.
Figures 3, 4:
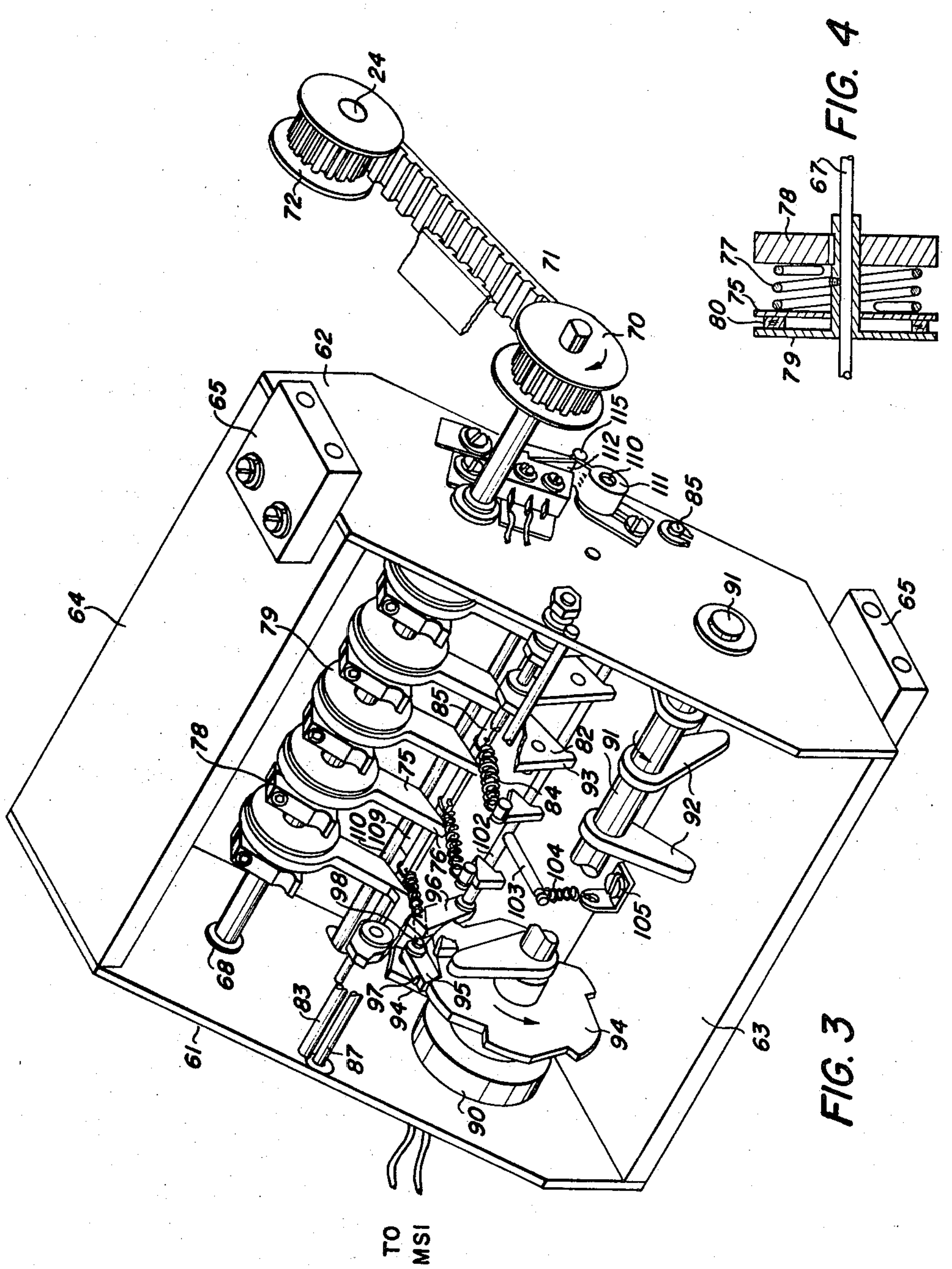
FIG. 3 is an isometric view of the signal storage device hereof.
FIG. 4 is a rear elevation of the signal storage device.
Figure 5:
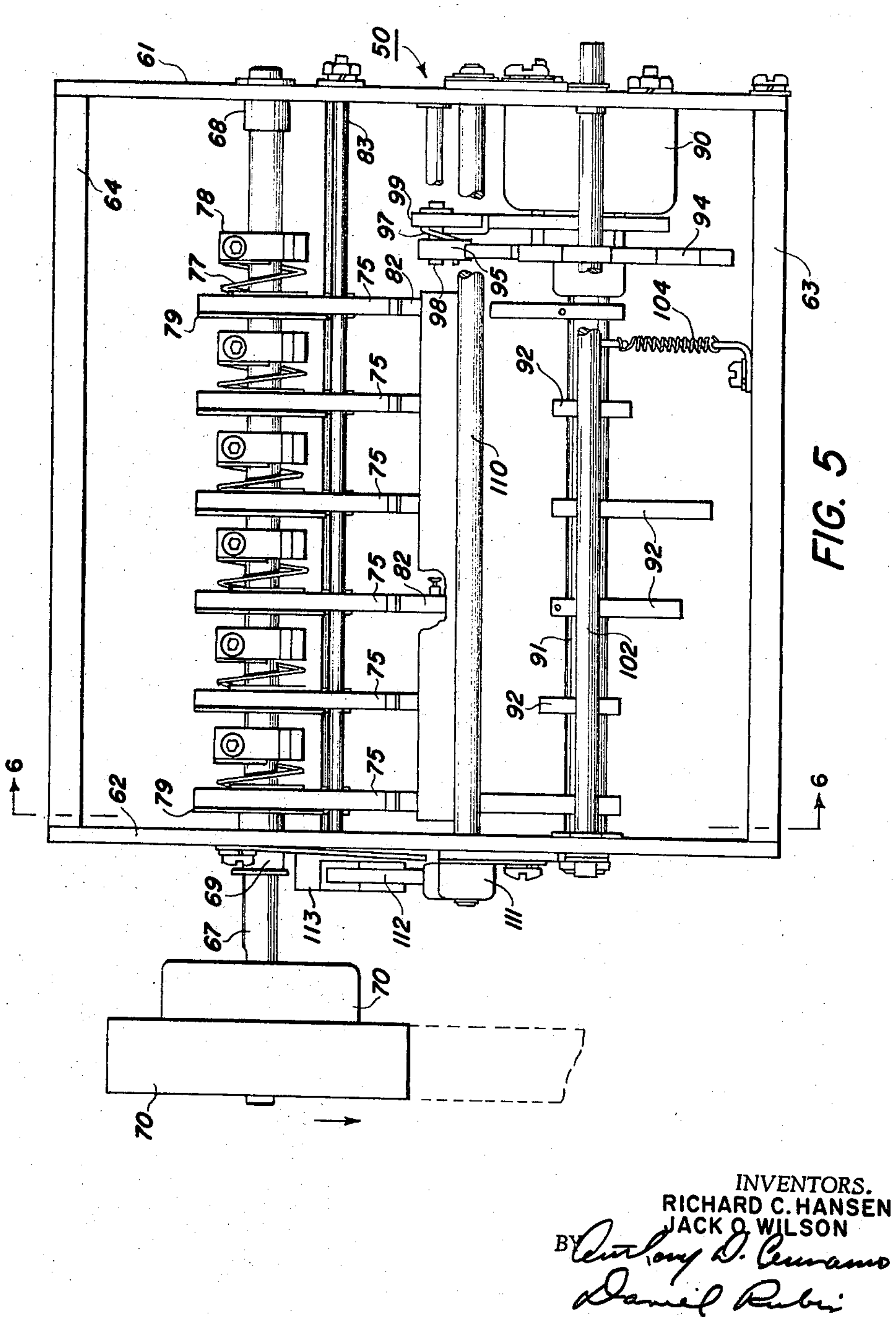
FIG. 5 is an enlarged fragmentary view of a construction detail.

As shown in FIG. 1 the xerographic apparatus described my comprise a type disclosed in Patent U.S. 3,076,392 in which copy to be reproduced is placed in a support tray 10 from which it is fed onto a transport mechanism generally designated 11. Suitable drive means are provided for the transport mechanism from motor 12 to endless belts 13 whereby the original copy is moved past the optical axis of projection lens system 14 and is illuminated by a projection lamp LMP–1. The image of the copy is reflected by mirror 15 to an adjustable objective lens 16 and then reflected by mirror 17 downwardly through a vertical slit aperture assembly 18 onto the surface of a xerographic plate in the form of drum 19.

Xerographic drum 19 includes a cylindrical member mounted on an axle 24 end supported in suitable bearings in the frame of the machine and is driven by motor 23 to rotate the drum in a clockwise direction and at a constant rate that is proportional to the transport rate of the copy, whereby the peripheral rate of the drum surface is identical to the rate of movement of the reflected light image. The drum surface comprises a layer of photoconductive material on a conductive backing that is sensitized prior to exposure by means of a corona generating device 25 energized from a suitable high potential source.

The exposure of the drum to the light image discharges the photoconductive layer in the areas struck by light, whereby there remains on the drum a latent electrostatic image in image configuration corresponding to the light image projected from the copy. As the drum surface continues its movement, the electrostatic latent image passes through a developing station 26 at which a two component developer material 27 is cascaded over the drum surface by means of a developing apparatus 28.

In the developing apparatus, developer material is carried by conveyor 29 driven by suitable drive means from motor 30 and is released onto the chute 31 to cascade down over the drum surface. The consumable portion of the developer is contained in dispenser 33 and is released to the developer in amounts controlled by gate 34. After developing, the xerographic powder image passes a discharge station 41 at which the drum surface is illuminated by a lamp LMP–2, whereby residual charges on the nonimage areas of the drum surface are completely discharged. Thereafter, the powder image passes through an image transfer station 42 at which the powder image is electrostatically transferred to a support web surface 43 by means of a second corona generating device 44 while the drum is cleaned by means of brushes 55.

The support surface to which the powder image is transferred comprises a continuous web of paper, vellum, cardstock, etc., obtained from a supply roll 45 and from which it is advanced over suitable tensioning rolls being directed into surface contact with the drum in the immediate vicinity of transfer corona generating device 44. After transfer, the support web is separated from the drum surface and guided through a fusing apparatus 56 at which the powder image is permanently affixed thereto. Thereafter, the support surface is continued to be fed by means of a pair of feed rolls 46 and 47 driven by motor 40 until passing a cutter unit 49 appropriately actuated via a drive unit 54 by the signal storage device 50 hereof, as will be described. This effects cutter operation after which the cut sheet is fed via feed rolls 51 and 52 to a hopper bin 53. The cutter 49 may typically be of a type described in U.S. Patents 3,105,425 or 3,075,493.

Figure 2:
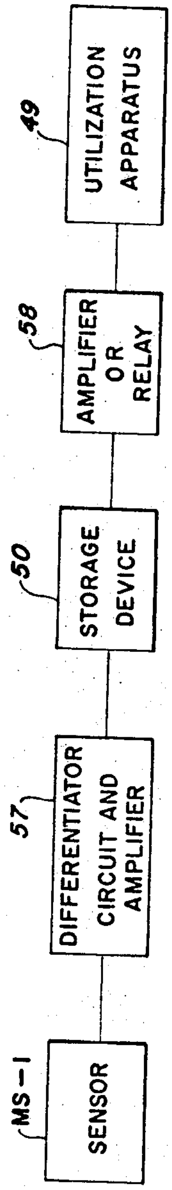
FIG. 2 is a schematic block diagram for operating the device in the manner hereof.

Operation of the signal storage device 50 in order to effect the appropriate control and timing sequence for actuating cutter 49 can be generally understood by reference also to FIG. 2 as there shown. A signal is initiated by a microswitch sensor MS–1 having a switching arm extending through transport belt 13 in the path of original copy passing thereover. As each original copy passes over the microswitch the actuating arm thereof is caused to be depressed by the leading copy edge and remains so until the trailing edge has passed permitting the actuating arm to revert to a normally open contact of the switch member, as will be understood. In normal operation, a cut signal is transmitted when the microswitch is both activated and deactivated corresponding to a cut signal at a leading and trailing edge respectively. Differentiator amplifier 57 responds to a condition change in sensor MS–1 to supply a signal to the storage device. The output from the storage device is then conducted through an emplifier 58 to the utilization apparatus here indicated to be cutter 49. Other sensor units, such as photoelectric units or the like could likewise be used, the only requirement being that it be electrically responsive to the passing of copy thereover. Likewise the signal from MS–1 can be transmitted in various ways as in a facsimile system disclosed in U.S. Patent 3,196,766.

The signal storage device 50 will now be described with reference to FIGS. 3–6. The device generally is comprised of components all supported on a support frame formed of sidewalls 61 and 62, bottom wall 63 and top wall 64. Bar brackets 65 secured to the top and bottom walls permit mounting the device in a suitable location within the apparatus in which it is utilized as in the recording apparatus described above.

In order that a synchronized timed relation be maintained after microswitch MS–1 is actuated, until corresponding copy-bearing portion of the web 43 arrives in the vicinity of cutter 49, there is provided a continuously driven shaft 67 mounted for rotation in opposite bearings 68 and 69 contained in the opposite side walls. On the end of the shaft extending outward of wall 62 is secured a timing pulley 70 being driven by belt 71 connected also to pulley 72 secured to drum axle 24. Since the speed of web 43 is synchronized to the peripheral speed of drum 19 a constant timed relation is maintained between shaft 67 and the formation of copy and consequently between an input and an output signal from device 50. As will be understood, the total delay equals the time lapse from an image exposure onto the drum until the image reproduction on the web appears at the cutter proximity.

Storage of the signal is provided by a plurality of spaced apart finger-like delay arms 75 slip-coupled to the shaft and extending radially outward therefrom to a point 76. Urging each of these delay arms to rotate with the shaft on receipt of an input signal is a slip clutch formed of a spring 77 compressed between the face of arm 75 and an adjustably set collar 78 forcing the arm into frictional contact via cork ring 80 against a facing disc 79 secured as a sleeve onto the shaft. This relationship can be best seen in FIG. 5.

Figure 6:
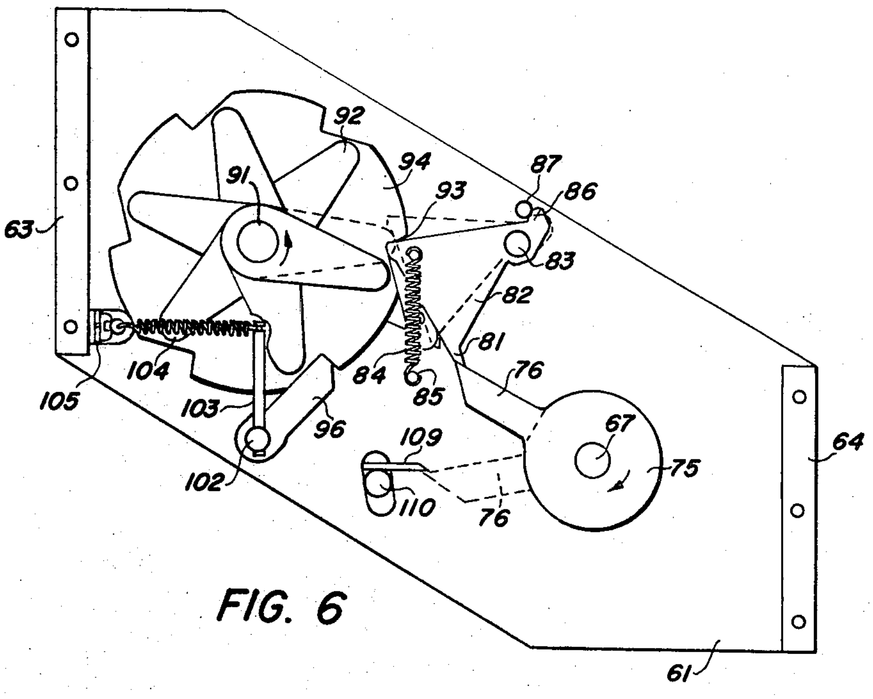
FIG. 6 is a sectional elevation taken substantially along the lines 6—6 of FIG. 5.
Figure 7:
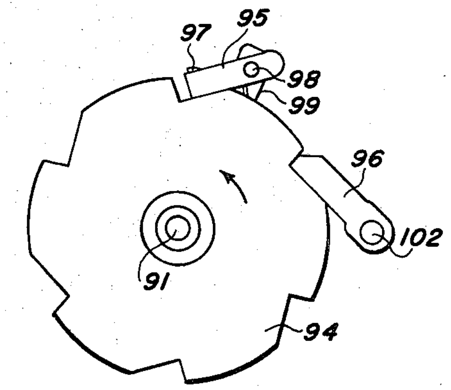
FIG. 7 is an enlarged view of the ratchet drive.

In the absence of an input signal each delay arm is impeded, i.e., prevented from rotating with the shaft, by having its end 76 engaged by a forward protruding tip 81 of a paired stop plate 82 which is pivotally mounted on a stationary rod 83 extending between the side walls of the support frame. In its normal position, the stop plate is maintained as shown in FIG. 6 with each delay arm impeded in a coplanar position extending parallel to the axis of shaft 67 by means of a tension spring 84 secured thereto from a stationary rod 85. The spring urges the rear shoulder 86 of the stop plate against a stationary rod 87 bringing the tip 81 to its counterclockwisemost position impeding the delay arm. While in this position, each stop plate maintains its associated delay arm in a readied position overcoming the existing frictional drive effected from the rotation of drive shaft 67 and disc 79.

Each signal intended to effect cutter operation whether emitted directly from activation of microswitch MS–1 or otherwise transmitted as described above, is conducted to a rotary solenoid 90 having an oscillatory action forward drive and snap return effected by the energizing and deenergizing thereof. The solenoid, when energized by a received cut signal, effects an angular rotation of shaft 91 by means of a rotatable ratchet 94 connected to the shaft which is supported piloted on the solenoid shaft and in opposite sidewall 62. Secured on shaft 91 are a plurality of cam lobes 92 each equally angularly displaced (e.g., 60°) from its adjacent lobe and all rotatable with the shaft on each occasion an input signal is received at the solenoid 90. As is shown dashed in FIG. 6, a cam lobe 92 is rotating to engage its associated stop plate 82 at the tip 93 which causes the latter to pivot partially about rod 83 sufficient to disengage tip 81 from delay arm point 76 whereby the delay arm is unimpeded and permitted to rotate with shaft 67.

Secured to shaft 91, to be rotated in response to the energizing of the solenoid, is the ratchet plate 94. Advancement of the ratchet by means of the solenoid is effected by pawl 95 which is spring urged downwardly against the ratchet teeth by means of a torsion spring 97. The pawl is mounted on pin 98 secured in turn to radial solenoid arm 99 which is partially rotated in a forward direction on each occasion the solenoid is energized. This effects a forward stroke of the pawl urging the ratchet through an angular displacement which is transmitted to shaft 91. To prevent back-motion of the shaft and the lobes thereon during the back stroke of the solenoid the ratchet teeth are engaged by a backstop pawl 96. This latter pawl is secured to pivot bar 102 which urges the pawl against the ratchet teeth by means of arm 103 secured at its forwardmost end to a tensioned spring 104 connected also to a clip 105 mounted on the bottom plate. By this means, each energizing of the solenoid, evidencing the need for an input cut signal causes the ratchet plate 94 and in turn shaft 91 and its supported cam lobes 92, to rotate through an angular displacement at the same time pawl 96 engages the backside of the ratchet teeth to prevent any possible back motion of the ratchet during the return stroke of solenoid arm 99 and the drive pawl 95.

Since the cam lobes 92 are themselves angularly displaced from each other they sequentially engage their associated paired stop plate 82 the latter of which in turn releases its associated paired delay arm 75 to permit its rotation along with shaft 67. As each delay arm is released it travels a complete circle until returning to the same stop position from which it started as it engages the restored tip 81 of its associated stop plate. Upon reaching a predetermined point in its path of travel (as shown dashed in FIG. 6) the delay arm tip 76 engages a bar 109 secured to a pivotal rod 110. The rod is supported between the side walls and extends through the sidewall 62 at which end there is secured a switch actuator 111 normally resting against a stop bar 115. On every occasion in which bar 109 is struck by a passing delay arm 82 it in turn causes actuator 111 to engage spring biased switch arm 112 of cutter control switch 113. In the absence of being actuated the spring bias of 112 maintains the actuator 111 in position against its stop bar. Lead 114 extending therefrom through an amplifier 58 to the cutter control energizes the cutter mechanism for a cut signal whenever switch 113 is actuated or within a predetermined time period thereafter. The latter situation would apply where for example it is desired to provide borders or margins before a leading edge and after a trailing edge. Under these circumstances the signal to cut is required before and after the actual arrival of the leading and trailing edges respectively at the cutter.

In operation, as each input cut signal is received at the solenoid 90, shaft 91 is caused to rotate through an angular displacement whereby one of the cams 92 thereon causes a release of an associated paired stop plate 82. This in turn releases its associated paired delay arm 75. Since the cams 92 are all equally displaced, e.g., 60° from each other, they have the effect of sequentially releasing a different delay arm 75 with each subsequently received signal to be stored. At the same time since the timed release of each delay arm is solely related to the input signal it represents, one or all of the delay arms can be concomitantly rotating for storing as many signals as there are delay arms with which to store signals. Six delay arms are shown but more or less could be employed for sequentially engaging bar 109.

By the above description there is disclosed a novel signal storage device whereby a plurality of input electrical signals received at random can be concomitantly stored to maintain a delayed output thereof. By means of the invention hereof, this is accomplished by mechanical means simply and inexpensively without complex controls or circuitry while having the flexibility of accommodating any plausible quantity of concomitantly stored signals. The apparatus is accurate in maintaining a fixed time delay between input and output signals and is completely variable with regard to the random order in which the signals can be received and maintained. From the description above it should be appreciated that the travel time for the delay arms to actuate the output signal switch is substantially fixed in a relative sense as a function of drum and with travel. This relationship is always maintained at whatever operational speed or even after shutdown and restart. Whereas this relationship can be varied by appropriate gearing or the like some built-in circuit delays, adjustable or not, may be required to effect a precise action of utilization apparatus or adjustment compensation in the particular installation in which it is embodied. An example of this requirement is the different cutting relation required for effecting margins associated with a leading edge as opposed to a trailing edge of a recorded document.

Since many changes could be made in the above construction and many apparently widely different embodiments of this invention could be made without departing from the scope thereof, it is intended that all matter contained in the drawings and specifications shall be interpreted as illustrative and not in a limiting sense.

What is claimed is:

1. A signal storage device for emitting a time delayed output of an input signal comprising in combination:

(a) means adapted for movement at a rate having a predefined time relation between an input signal and a required corresponding output signal thereof;

(b) switch actuating means slip-coupled to said last recited means to slip relative thereto when impeded and when unimpeded to travel coupled therewith to a switch actuating position;

(c) means operable in response to the receipt of an input signal to be stored to effect a travel couple between said switch actuating means and said first recited means; and (d) switch means operably supported interposed in path of said actuating means when moving to emit an output signal when actuated by said switch actuating means.

2. A signal storage device according to claim 1 in which said input signals originate remotely and are transmitted by means of a facsimile transmission.

3. A signal storage device for emitting a time delayed output of an input signal comprising in combination:

(a) means adapted for movement at a rate having a predefined time relation between an input signal and a required corresponding output signal thereof;

(b) switch actuating means slip-coupled to said last recited means to slip relative thereto when impeded and when unimpeded to move coupled therewith to a switch actuating position;

(c) release means operably supported in the path of said switch actuating means to impede said switch actuating means in the absence of a received input signal to be stored and to release said switch actuating means on receipt of an input signal; and (d) switch means operably supported interposed in the path of said actuating means when moving to emit an output signal when actuated by said switch actuating means.

4. A signal storage device in accordance with claim 3 in which said switch actuating means is comprised of a plurality of individual actuators each of which is paired with one of a plurality of said release means releasable in an order of receipt of input signals for storing a plurality of input signals concomitantly.

5. A signal storage device for emitting a time delayed output of input signals comprising in combination:

(a) a shaft journaled for rotation;

(b) drive means operatively connected to said shaft to continuously effect a rotational rate thereof having a predetermined time relation to the time delay to be effected;

(c) a plurality of spaced apart delay arms each slip-coupled on said shaft to slip thereon when impeded and to rotate therewith when unimpeded;

(d) a plurality of arm impeders each paired with one of said delay arms and movably supported to impede its paired arm when in a first position and to permit rotation thereof when in a second position;

(e) a second shaft journaled for rotation;

(f) a plurality of cam means secured on said second shaft each paired with one of said delay arm impeders adapted to effect movement thereof from said first to said second positions and each having its effective camming surface angularly displaced from the other of said cam means;

(g) signal receiving means operatively coupled to said second shaft and responsive to receipt of an input signal to rotate said second shaft through an angular displacement sufficient for at least one cam means thereon to move its paired impeder from said first to said second positions; and (h) switch means having actuator means supported interposed in the travel path of said delay arms to emit an output signal when its actuator means is contacted by any of said delay arms in travel.

6. The signal storage device according to claim 5 in which said arm impeders impede said delay arms along a common plane extending axially parallel to said first recited shaft on which said arms are coupled.

7. The signal storage device according to claim 5 in which the signal storage capacity for concomitant storage of signals is directly related to the number of delay arms coupled to said first recited shaft.

8. The signal storage device according to claim 5 including a rotary solenoid energized by receipt of an input signal and operably connected to effect a partial rotation of said second shaft when energized.

9. In a xerographic reproduction apparatus including means to form reproductions of original copy during the course of its movement onto a continuously moving web and cutter means for cutting said web in spaced relation to the reproduction thereon, a signal storage device for emitting a time delayed output signal for the operation of said cutter from an input signal generated by the movement of the original copy comprising in combination:

(a) means adapted for movement at a rate having a predefined time relation between the receipt of a said input signal and the required corresponding output signal thereof;

(b) switch actuating means slip-coupled to said last recited means to slip relative thereto when impeded and when unimpeded to move coupled therewith to a switch actuating position;

(c) release means operably supported in the path of said switch actuating means to impede said switch actuating means in the absence of a received input signal to be stored and to release said switch actuating means on receipt of an input signal; and (d) switch means operably supported interposed in the path of said actuating means when moving to emit an output signal for effecting operation of said cutter when actuated by said switch actuating means.

10. A signal storage device according to claim 9 in which said xerographic apparatus forms reproductions in response to a received facsimile signal.

11. A signal storage device in accordance with claim 9 in which said switch actuating means is comprised of a plurality of individual actuators each of which is paired with one of a plurality of said release means releasable in an order of receipt of input signals for storing a plurality of input signals concomitantly.

12. In a xerographic reproduction apparatus including means to form reproductions of original copy during the course of its movement onto a continuous moving web and cutter means for cutting said web in spaced relation the reproductions thereon generated by the movement of the original copy;

a signal storage device for emitting a time delayed output signal for the operation of said cutter from an input signal comprising in combination:

(a) a shaft journaled for rotation;

(b) drive means operatively connected to said shaft to continuously effect a rotational rate thereof having a predetermined time relation to the time delay to be effected;

(c) a plurality of spaced apart delay arms each slip-coupled on said shaft to slip thereon when impeded and to rotate therewith when unimpeded;

(d) a plurality of arm impeders each paired with one of said delay arms and movably supported to impede its paired arm when in a first position and to permit rotation thereof when in a second position;

(e) a second shaft journaled for rotation;

(f) a plurality of cam means secured on said second shaft each paired with one of said delay arm impeders adapted to effect movement thereof from said first to said second positions and each having its effective camming surface angularly displaced from the other of said cam means;

(g) input signal receiving means operatively coupled to said second shaft and responsive to receipt of an input signal to rotate said second shaft through an angular displacement sufficient for at least one cam means thereon to move its paired impeder from said first to second positions; and (h) switch means having actuator means supported interposed in the travel path of said delay arms to emit an output signal for effecting operation of said cutter when its actuator means is contacted by any of said arms in travel.

References Cited

UNITED STATES PATENTS

| | | | |
|---|---|---|---|
| 2,877,846 | 3/1959 | Tobey | 83—400 |
| 3,164,074 | 1/1965 | Francis | 95—1.7 |

NORTON ANSHER, *Primary Examiner.*

LEO H. McCORMICK, *Assistant Examiner.*

U.S. Cl. X.R.

83—203, 399; 355—14